United States Patent [19]

Carroll et al.

[11] Patent Number: 4,687,966

[45] Date of Patent: Aug. 18, 1987

[54] DEFLECTION YOKE FOR ADHESIVE ASSEMBLY AND MOUNTING

[75] Inventors: Charles B. Carroll, Trenton, N.J.; David L. Houston, Indianapolis, Ind.

[73] Assignee: RCA Corporation, Princeton, N.J.

[21] Appl. No.: 900,956

[22] Filed: Aug. 27, 1986

[51] Int. Cl.[4] .......................... H01S 9/00; H04N 5/64

[52] U.S. Cl. .......................... 313/440; 358/248

[58] Field of Search .......................... 313/440; 358/248; 335/210, 213; 445/23, 36

[56] References Cited

U.S. PATENT DOCUMENTS 4,016,363 4/1977 Deal et al. .......................... 358/248

4,616,265 10/1986 Lyden .......................... 358/248

*Primary Examiner*—Palmer C. DeMeo

*Assistant Examiner*—Sandra L. O'Shea

*Attorney, Agent, or Firm*—Paul J. Rasmussen; Joseph Laks; Scott J. Stevens

[57] ABSTRACT

A deflection yoke for a video display system incorporates an arrangement for the introduction and distribution of adhesive to effect assembly of the yoke and mounting of the yoke to a cathode ray tube. A single adhesive inlet location transports adhesive through delivery channels to various locations about the deflection yoke to fix the relative positions of the horizontal and vertical deflection coils as well as mounting the yoke to a cathode ray tube.

2 Claims, 8 Drawing Figures

DEFLECTION YOKE FOR ADHESIVE ASSEMBLY AND MOUNTING

This invention relates to video display systems and, in particular, to the assembly and mounting of a video display system deflection yoke.

The display system of a video display apparatus essentially consists of a deflection yoke and cathode ray tube (CRT). The CRT includes an electron gun assembly that produces one or more electron beams that strike and illuminate a phosphor display screen located on the front panel of the CRT. The deflection yoke is mounted on the neck of the CRT and produces electromagnetic fields that deflect the electron beams in a particular pattern to form a scanned raster on the CRT display screen. The electromagnetic fields are produced by orthogonally arranged deflection coils that respectively deflect the electron beams in horizontal and vertical directions on the CRT display screen. It is important that the deflection coils be properly oriented during assembly of the yoke and that the yoke be properly positioned when mounted on the CRT in order to avoid distortion in the shape of the scanned raster or errors in the landing positions of the electron beams on the CRT display screen. Known arrangements for mounting an assembled yoke on the CRT include mechanical clamps and screw-type position adjusters, or rubber wedges at the front of the yoke to maintain the adjusted position of the yoke. Mounting structures such as those previously described, however, require a relatively large amount of manual labor to implement. Additionally the deflection yoke must be preassembled and some form of mechanism is necessary to position or adjust the mounting structure while the yoke is temporarily held in position.

U.S. patent application Ser. No. 684,603, filed Dec. 21, 1984 and allowed Oct. 7, 1986, now U.S. Pat. No. 4,616,265, in the name of Thomas B. Lyden and entitled, "DEFLECTION YOKE ASSEMBLY AND MOUNTING ARRANGEMENT", herein incorporated by reference, describes an arrangement for mounting a deflection yoke including an apparatus that sequentially dispenses a fast-set and a slow-set adhesive that permits inexpensive and simple assembly and mounting of a deflection yoke. The deflection yoke used in such an assembly and mounting arrangement is desirably adapted to permit efficient distribution of the adhesive in such a way that the individual yoke components may be assembled simultaneously with the mounting of the yoke to the CRT.

In accordance with an aspect of the present invention, a display system for a video display apparatus comprises a cathode ray tube and a deflection yoke mounted on the cathode ray tube. The yoke comprises line and field rate deflection coils and an insulator supporting the deflection coils. The insulator incorporates an adhesive ingress port located at the rear of the insulator. First and second adhesive distribution channels are circumferentially disposed about opposite sides of the tube for distributing the adhesive about the circumference of the tube. An egress port is located in each of the channels and directs the flow of the adhesive to the region between the yoke and the tube in order to attach the yoke to the tube.

In the accompanying drawing, FIG. 1 is a schematic and block diagram of a portion of a video display apparatus;

Figure 1:
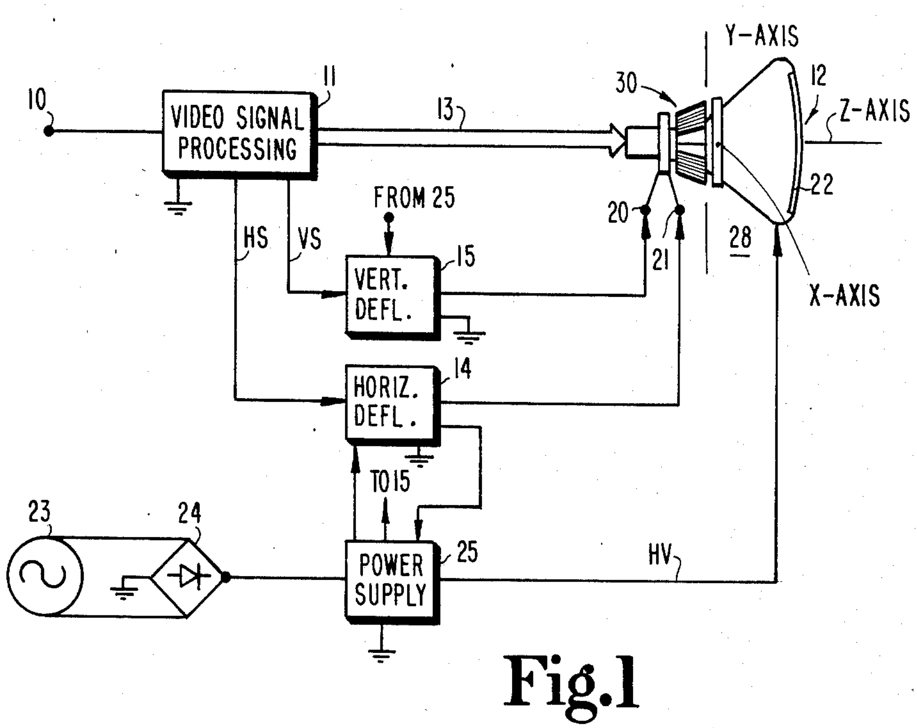

FIG. 1 illustrates a video display apparatus in which a video signal at a terminal 10 is applied to a video processing circuit 11. The video signal is provided from a source of video signals (not shown), such as a television receiver tuner or an external source, such as a video cassette recorder. The video signal processing circuit 11 generates electron beam drive signals and applies them via a conductor 13 to the electron gun assembly (not shown) of a cathode ray tube (CRT) 12 in order to modulate the intensity of the electron beam or beams produced by the electron gun assembly in accordance with the information of the video signal.

Video signal processing circuit 11 also produces horizontal, or line-rate, and vertical, or field-rate, synchronizing signals that are applied to horizontal deflection circuit 14 and vertical deflection circuit 15, respectively, along conductors designated HS and VS. Vertical deflection circuit 15 generates vertical deflection rate signals that are applied via a terminal 20 to the vertical or field-rate deflection coils of deflection yoke 30, located on CRT 12, in order to produce vertical deflection current in the deflection coils. Horizontal deflection circuit 14 generates horizontal deflection rate signals that are applied via a terminal 21 to the horizontal or line-rate deflection coils of yoke 30, in order to produce horizontal deflection current. The combination of CRT 12 and yoke 30 form a display system 28. The horizontal and vertical deflection current flowing in yoke 30 produces electromagnetic fields that deflect or scan the electron beams along the X and Y axes, respectively, to form a raster on the phosphor display screen 22 of CRT 12.

Power for the video apparatus is provided from an AC power source 23 which is connected to a rectifying circuit 24 which produces and applies an unregulated DC voltage to a power supply circuit 25. Power supply circuit 25, illustratively of the flyback type, includes regulating circuits which act to produce regulated voltage levels that are used to provide power to horizontal deflection circuit 14 and vertical deflection circuit 15, for example. Power supply 25 also supplies a high voltage level of the order of 25 KV along a conductor HV to the high voltage or ultor terminal of CRT 12.

Figure 2:
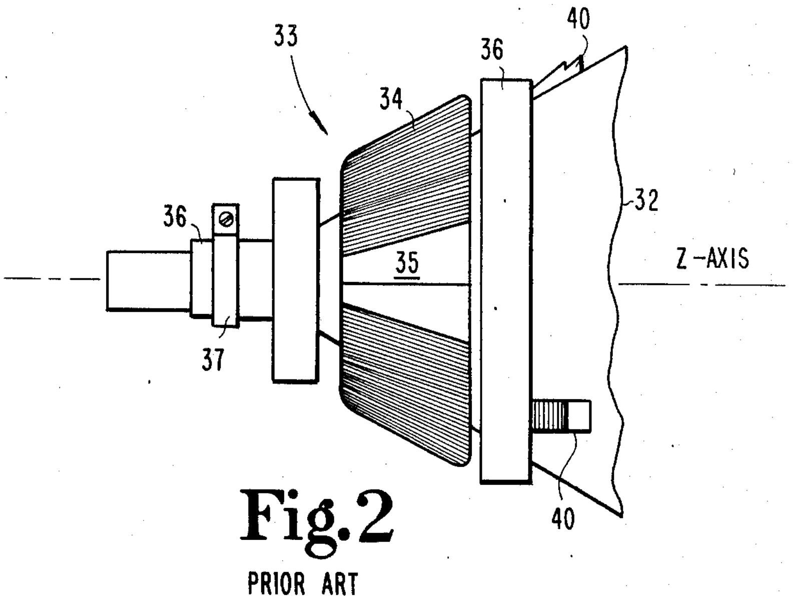
Fig.2 PRIOR ART
FIG. 2 is a side elevational view of a video display system of the prior art.

Deflection yoke 30 of video display system 28 must be assembled such that the horizontal and vertical deflection coils are properly aligned with each other in order to produce orthoganol deflection of the beams. The yoke must also be mounted on CRT 12 in correct position to effect proper beam deflection in order to produce a substantially distortionless scanned raster. A video display system 31 of the prior art, as shown in FIG. 2, includes a CRT 32 and a deflection yoke 33. Deflection yoke 33 comprises vertical deflection coils 34 toroidially wound on a magnetically permeable core 35 which surrounds the horizontal deflection coils (not shown). A plastic insulator 36 physically supports and separates the horizontal and vertical deflection coils. The coils may be secured to insulator 36 by conventional means, such as glue. The rear portion of insulator 36 is mounted to the neck of CRT 32 by a screw-tightened clamp 37 in order to fix the longitudinal or Z-axis position of yoke 33. The yoke is tilted about the clamped point to effect error and distortion correction. During mounting and adjustment the yoke is held in place by a yoke adjustment machine or fixture (not shown). The adjusted position of the front of yoke 33 is fixed by tapered rubber wedges 40 which are inserted between yoke 33 and CRT 32 at several locations about the front of the yoke.

The previously described adjustment and mounting procedure is difficult to automate due to the variability in the position of the adjusted yoke from tube to tube. Additionally, the procedure is preferably effected with an assembled yoke, thereby requiring additional yoke assembly and adjustment equipment. The previously described U.S. patent application having Ser. No. 684,603, discloses a yoke assembly and mounting arrangement that permits relative adjustment of the yoke deflection coils as well as simultaneous adjustment of the complete yoke on the cathode ray tube. The individual components of the yoke must be designed, however, to insure that the assembly and mounting adhesive is distributed in a manner that provides a strong, permanent assembly, yet makes efficient use of the adhesive without waste.

Figure 3:
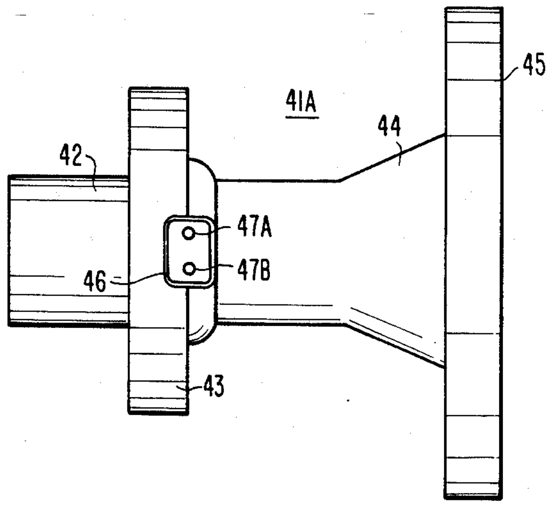
FIG. 3 is a side elevational view of a portion of a deflection yoke insulator, illustrating an aspect of the present invention.
Figure 4:
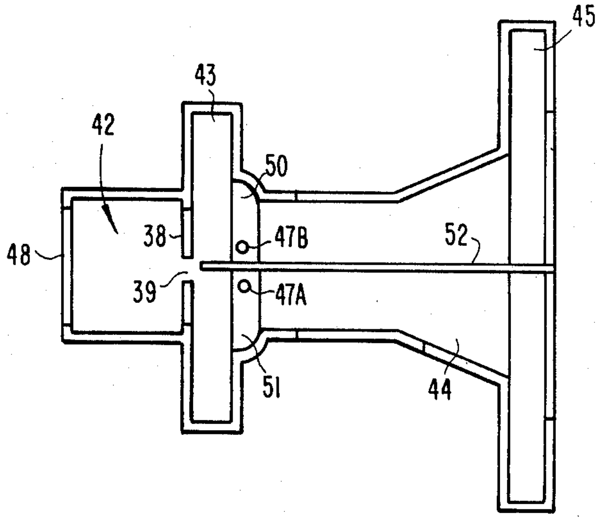
FIG. 4 is an opposite side elevational view of the insulator shown in FIG. 3.
Figure 5:
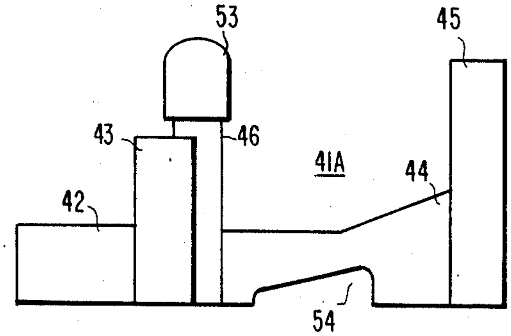
FIG. 5 is a plan view of an insulator similar to that shown in FIG. 3.
Figure 6:
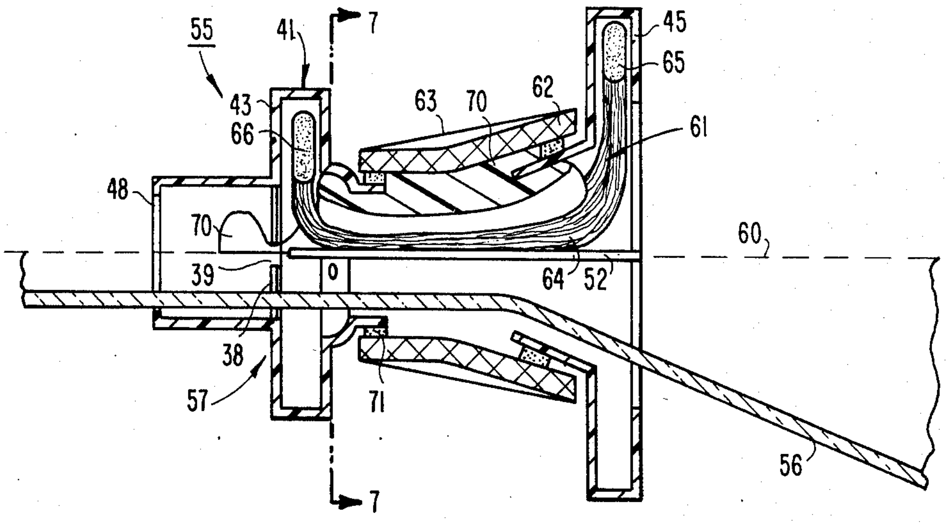
FIG. 6 is a side cross-sectional elevational view of a video display system in accordance with an aspect of the present invention.

In accordance with an aspect of the present invention, a deflection yoke that provides the previously described advantages comprises an insulator 41 having two formed halves, one of which is shown in FIGS. 3, 4 and 5. For simplicity and efficiency of manufacture and assembly, the yoke insulator halves may be identical. FIG. 3 illustrates an outside view of a representative insulator half 41A which includes a rear portion 42 that fits around the neck of a CRT, a rear coil end turn housing 43, a tapered central portion 44 and a front coil end turn housing 45. Disposed in the vicinity of the junction of a rear end turn housing 43 and central portion 44 is an adhesive inlet housing 46 that encloses adhesive inlet ports 47A and 47B. As can be in the inside view of insulator half 41A in FIG. 4, inlet ports 47A and 47B extend into adhesive delivery chambers 50 and 51. An insulator rib or baffle 38 is disposed about the CRT neck-surrounding rear portion 42 of insulator half 41A. Insulator rib 38 includes an adhesive egress port 39 that allows adhesive from delivery chambers 50 and 51 to enter the rear portion 42 of insulator 41. An insulator rib or baffle 48 located at the rear end of rear portion 42 acts to prevent any adhesive from escaping the confines of insulator 41. An insulator rib 52 provides physical separation and positioning of the horizontal deflection coils, as shown in FIG. 6. Insulator rib 52 also separates adhesive delivery chambers 50 and 51. FIG. 5 shows a side view of insulator half 41A. An elastic cap 53 is shown in place over adhesive inlet housing 46. Elastic cap 53 acts to contain the spread of assembly adhesive in a manner to be described. Also shown in FIG. 5 is an insulator cutout portion 54. When the completed insulator 41 is formed from insulator halves 41A and 41B, the insulator cutouts 54 in each insulator half will form a hole through the insulator wall.

FIG. 6 illustrates a cross section of a video display system 55 having a CRT 56 and a deflection yoke 57 incorporating insulator 41. For easier understanding, the view of display system 55 above dashed line 60 is shown without CRT 56 in place. The view below dashed line 60 shows display system 55 without the corresponding horizontal deflection coil and adhesive in place. Deflection yoke 57 also incorporates horizontal deflection coils 61, magnetically permeable core 62, and vertical deflection coils 63, toroidally wound about core 62. Horizontal deflection coils 61, illustratively of the saddle-type, comprise an active region 64, front end turns 65, located with insulator front end turn housing 45, and rear end turns 66, located within insulator rear end turn housing 43. A portion of the active turn region abuts insulator rib 52, which aids in locating the position of the horizontal deflection coils.

A quantity of adhesive 70 is disposed between the horizontal deflection coil 61 and the surface of CRT 56 to maintain deflection yoke 57 in place on the CRT and to fix the position of horizontal deflection coils 61 with respect to insulator 41. In accordance with a novel aspect of the present invention, the adhesive is also shown as passing through the hole formed by cutout portions 54 of insulator 41 in order to fix the position of vertical deflection coils 63 and core 62 with respect to insulator 41. A ring-shaped pad 71 is placed between core 62 and insulator 41 in the vicinity of the perimeter of the hole formed by cutout portions 54 in order to limit the flow or spread of the adhesive 70.

Figure 7:
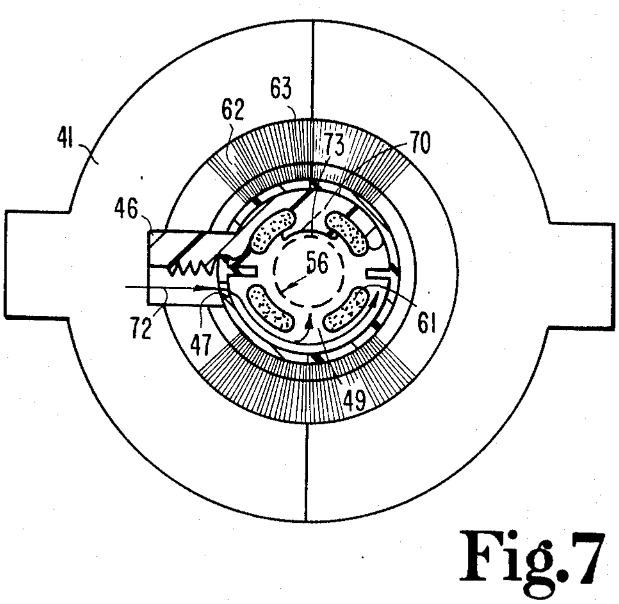
FIG. 7 is a rear cross-sectional elevational view of a deflection yoke similar to that shown in FIG. 6, illustrating an aspect of the present invention.

In accordance with a novel aspect of the present invention, yoke 57 is designed to permit the assembly of the yoke itself and the mounting of the yoke on the CRT by adhesive introduced via a single adhesive entry location, namely, adhesive inlet housing 46. As can be seen in FIGS. 6 and 7, adhesive is introduced through inlet ports 47A and 47B via adhesive inlet housing 46. Arrow 72 illustrates the path of adhesive. Dashed line 73 represents the outer surface of CRT 56. Elastic cap 53, not shown in FIG. 7 for clarity, encloses adhesive inlet housing 46 and causes the adhesive to be forced through inlet ports 47A and 47B as adhesive is introduced. As the adhesive passes through inlet ports 47A and 47B, it flows along circumferential adhesive delivery chambers 50 and 51, which acts to direct the adhesive about the yoke to delivery chamber egress ports 39 and 49. The presence of horizontal deflection coils 61 acts to define one wall of adhesive delivery chambers 50 and 51. The space between the active turns in each of the horizontal deflection coils 61 acts to define egress port 49 as shown in FIG. 7. Insulator ribs 52 also act as baffles to limit the flow of adhesive within delivery chambers 50 and 51. The volume of adhesive introduced is sufficient to fill chambers 50 and 51 thereby fixing the position of horizontal deflection coils 61 with respect to insulator 41, and to force adhesive through port 39 of rib 38 in order to attach the rear portion of yoke 57 to CRT 56 and through the spacing or port 49 between the active conductor bundles of the horizontal deflection coils 61 and into the region between the horizontal deflection coils and the outer surface of CRT 56, thereby attaching that portion of yoke 57 to CRT 56. Adhesive 70 will continue to flow toward the front of the yoke, along the contour of CRT 56, as shown in FIG. 6, in order to form a sufficient bond between yoke 57 and CRT 56, regardless of the spacing between the interior of yoke 57 and the surface of CRT 56, to hold yoke 57 in position during normal operation of video display system 55. As described previously, adhesive 70 will also flow through the insulator hole defined by symmetrical insulator cutout portions 54 in order to fix the position of the vertical deflection coils 63 and in core 62 with respect to insulator 41. Constraining ring or pad 71 allows sufficient adhesive to flow between vertical deflection coils 63 and insulator 41 to effect a strong bond but does not permit the flow of more adhesive than is necessary, thereby preventing waste of adhesive. It is possible, therefore, to adjust the relative positions of the horizontal and vertical deflection coils, as well as the overall position of the yoke on the cathode ray tube by way of appropriate adjustment fixtures (not shown), during assembly of the video display system and simultaneously provide permanent integral yoke assembly and mounting on the CRT by the introduction of adhesive through a single location. The need to preassemble and align deflection yokes is no longer necessary, although the present invention lends itself to mounting of preassembled yokes with the realization of many of the same advantages.

The yoke shown in FIG. 7 illustrates a single adhesive inlet port 46. As described previously, the insulator halves may be identical for simplified manufacturing and assembly. In that case, a second adhesive inlet housing is present. The novel arrangement of the deflection yoke, including the design of adhesive delivery chambers 50 and 51, only requires the introduction of adhesive at one location; i.e., only one inlet housing is necessary. The elastic cap 53 over the second inlet housing of the other insulator half prevents the escape of adhesive from the yoke assembly through the other inlet housing.

Figure 8:
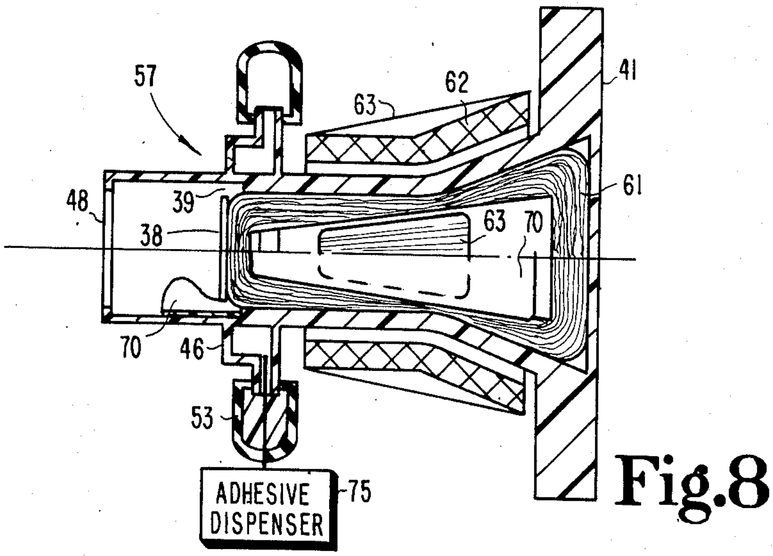
FIG. 8 is a cross-sectional plan view of a deflection yoke similar to that shown in FIG. 6, illustrating an aspect of the present invention.

FIG. 8 shows an illustrative arrangement in which a single adhesive dispenser 75 having a needle-like nozzle introduces the adhesive into inlet housing 46. The nozzle pierces elastic cap 53 and the desired quantity of adhesive is injected into adhesive inlet housing 46.

The present invention therefore allows the individual horizontal and vertical deflection coils of a deflection yoke to be specifically adjusted and aligned for a particular cathode ray tube. In a novel manner, adhesive may then be introduced through a single inlet location, effecting a permanent fixing of the relative positions of the yoke deflection coils as well as a permanent mounting of the deflection yoke on the cathode ray tube, thereby decreasing manufacturing cost and time, as well as improving the performance of the assembled video display system. The previously described procedures may be efficiently performed using automated adjustment and assembly techniques and equipment. The effective and efficient manner in which the assembly and mounting adhesive is distributed permits wider spacing distances between yoke components and between the yoke and the CRT than was possible using prior conventional techniques, thereby provides greater flexibility in the design and adjustment of the deflection yoke.

What is claimed is:

1. A display system for a video display apparatus comprising:

a cathode ray tube;

a deflection yoke, mounted on said cathode ray tube by a quantity of adhesive, comprising:

line rate deflection coils;

field rate deflection coils;

an insulating member, supporting said line and field rate deflection coils comprising:

an adhesive ingress port disposed at the rear of said insulator;

first and second adhesive distribution channels, circumferentially disposed about opposite sides of said cathode ray tube, for distributing said adhesive about the circumference of said cathode ray tube;

at least one egress port from each of said first and second distribution channels for directing the flow of said adhesive to the region between the interior of said deflection yoke and the surface of said cathode ray tube for attaching said deflection yoke to said cathode ray tube.

2. The arrangement defined in claim 1, wherein said insulator further comprises an aperture formed through said insulator for allowing said adhesive to flow through said insulator in order to attach said line rate deflection coils and said field rate deflection coils to said insulator in order to maintain the relative position of said line and field rate deflection coils.

* * * * *